Figure 1:
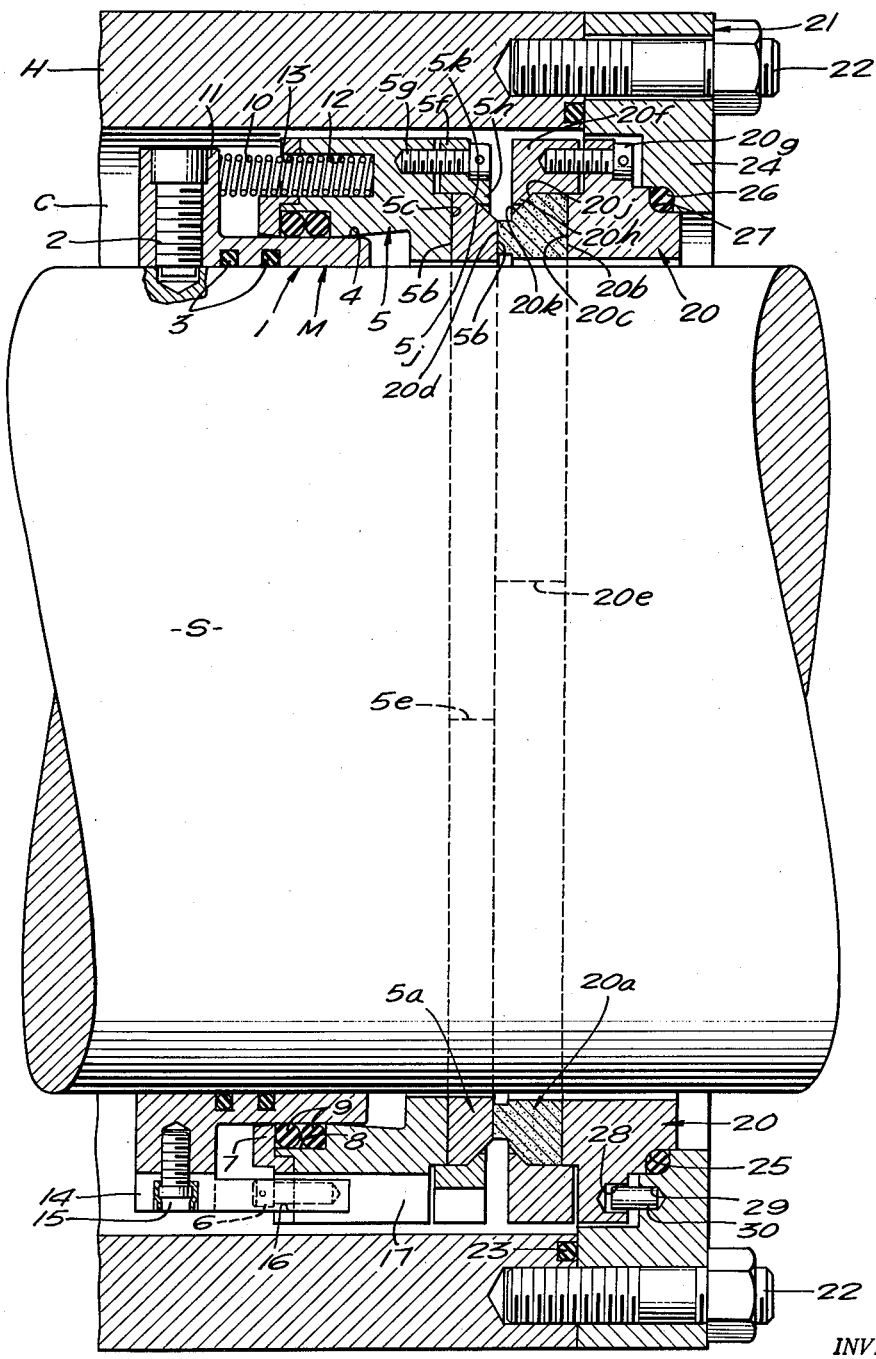

Aug. 20, 1963    H. E. TRACY    3,101,200
SECTIONAL MECHANICAL SEAL ASSEMBLY
Filed May 23, 1961    2 Sheets-Sheet 1

INVENTOR.
HERBERT E. TRACY
BY
Allen E Hambly
ATTORNEY

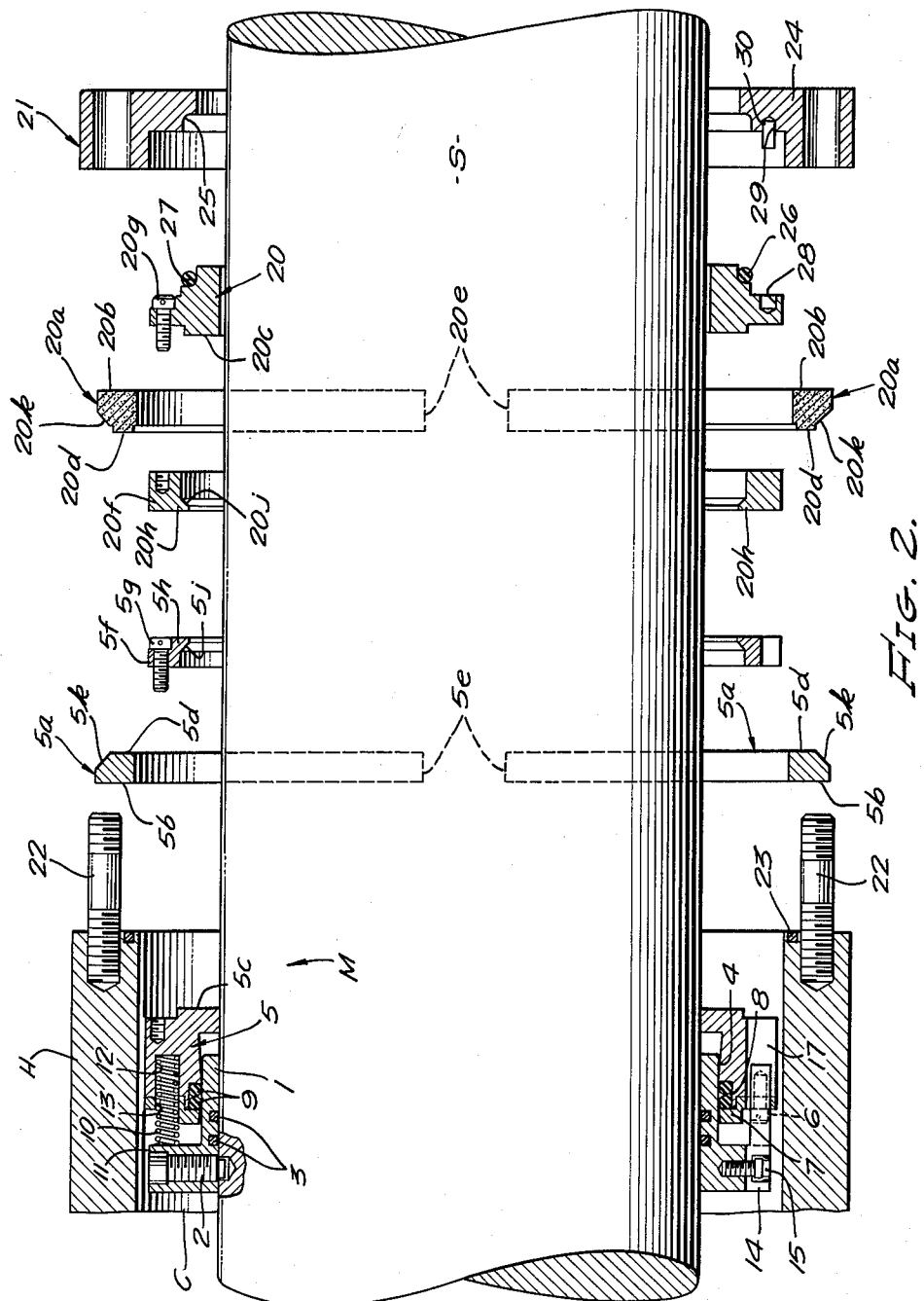

ved Aug. 20, 1963

United States Patent Office 3,101,200
Patented Aug. 20, 1963

3,101,200
SECTIONAL MECHANICAL SEAL ASSEMBLY
Herbert E. Tracy, Alhambra, Calif., assignor to Borg-Warner Corporation, Chicago, Ill., a corporation of Illinois
Filed May 23, 1961, Ser. No. 112,036
9 Claims. (Cl. 277—93)

The present invention relates to mechanical seals of the type wherein a pair of opposed relatively rotatable sealing rings are disposed with radially extended faces in sealing relation, and more particularly to such a mechanical seal which is sectionalized in such a manner that it may be serviced and maintained and the relatively rotatable sealing elements replaced, without requiring the stripping of the entire assemblage over the end of a shaft.

In certain mechanical seal installations the sealing elements are relatively inaccessible, thus requiring substantial effort and time to enable access to the sealing elements for the purpose of inspection, maintenance, replacement and the like.

An object of the present invention is to provide a mechanical seal assembly adapted to be disposed about a shaft, an end of which is not readily accessible and wherein the sealing elements may be inspected and replaced without requiring removal of the sealing parts from the end of the shaft. In accomplishing this objective, the relatively rotatable seal rings are preferably each sectionalized, in the sense that they are divided circumferentially into a plurality of sectors.

Another object is to provide a mechanical seal assembly including sectionalized relatively rotatable sealing rings and means for loading the ring sectors into end-to-end sealing engagement.

Other objects and advantages of the invention will be hereinafter described or will become apparent to those skilled in the art, and the novel features of the invention will be defined in the appended claims.

In the accompanying drawings:

FIG. 1 is a longitudinal sectional view through a mechanical seal assembly made in accordance with the invention and illustrated in association with a shaft which is shown in elevation; and FIG. 2 is an exploded detail sectional view of the assemblage of FIG. 1.

Like reference characters in the drawings and in the following description designate corresponding parts.

The mechanical seal of the present invention is illustrated in FIG. 1 as being interposed between a rotary shaft S and a housing H, between which there is defined an annular seal chamber C. The shaft S does not terminate within or adjacent to the housing H, but instead may project for some distance to a zone of relative inaccessibility; for example, in the case of a pump wherein the shaft S may be connected at one end to a pump impeller (not shown) and at the other end may be connected to a power source (not shown) for the impeller, access to the end of the shaft may require the removal therefrom of either the impeller or the power source, which is a time-consuming operation resulting in shut-down time insofar as the pump is concerned.

A mechanical seal assembly generally designated M is provided in accordance with the present invention in the chamber C between housing H and shaft S, and is so constructed that without requiring access to an end of the shaft, certain of the critical mechanical seal components, as will hereinafter more fully appear, may be inspected, serviced, or replaced with ease and dispatch.

The mechanical seal assembly herein illustratively shown includes a supporting sleeve 1, mounted as by means of one or more set screws 2 upon the shaft S within the chamber C. Between the shaft S and the sleeve 1 a pair of O-ring seals 3 provide means for preventing the leakage of fluid between the sleeve and the shaft. The sleeve 1 has an outer cylindrical surface 4 on which is slidably disposed a carrier ring 5. At one of its ends the carrier ring 5 has secured thereto, as by means of a suitable number of screw fasteners 6, an O-ring retainer 7 which forms a barrier at one end of an annular groove 8 in the inner periphery of the carrier ring 5, in which groove is disposed a pair of O-rings 9 constituting means for preventing the leakage of fluid between the carrier ring 5 and the sleeve 1.

Means are provided for normally biasing the carrier ring 5 in a righthand direction as viewed in FIG. 1. In the illustrative embodiment this means comprises a suitable number of circumferentially spaced coiled compression springs 10, abutting at one end with an outstanding flange 11 on the sleeve 1 and abutting at the other end with the carrier ring 5 within spring seating recesses 12 formed in the carrier ring 5. As seen in FIG. 1, each spring 10 extends through an opening 13 provided through the O-ring retainer 7.

Means are also provided for keying the carrier ring 5 to the sleeve 1, so that the carrier ring is rotatable along with the shaft S. For illustrative purposes, such keying means is illustrated as including one or more keys 14 connected to the flange 11 of sleeve 1 as by means of a screw fastener 15 and having a free end extending through an opening 16 in the O-ring retainer 7 and into a peripheral recess 17 in the carrier 5.

The mechanical seal assembly M includes a relatively stationary carrier ring 20, and means are provided for supporting the carrier ring 20 on the housing H in opposing relation to the carrier ring 5. For illustrative purposes, the assembly is shown as including an annular flange 21 which is secured to the housing H by means of a suitable number of circumferentially spaced screw fastenings 22. Sealing means, preferably in the form of an O-ring 23, are provided to prevent the leakage of fluid between the flange 21 and the housing H. The flange 21 has an inner marginal section 24 which is provided with an annular O-ring seat 25, in which is disposed an O-ring seal 26. The carrier ring 20 has a complemental outer peripheral, circumferentially extended O-ring seat 27, in which the O-ring 26 is engaged, so that this O-ring provides means for preventing the leakage of fluid between the flange 24 and the carrier ring 20.

Means are provided for holding the carrier ring 20 against rotation, and in this connection this carrier ring and the flange 21 may be provided with opposed recesses 28 and 29. A suitable number of such recesses may be provided in circumferentially spaced relation and a dowel 30 may be mounted in each recess 29 so as to extend longitudinally into the opposed recesses 28, thus holding the carrier ring 20 fixed to the flange 21 and against rotation.

It will be noted that the sealing means heretofore described; namely, the sealing rings 3 between the sleeve 1 and shaft S, the sealing means 9 between the carrier ring 5 and sleeve 1, the sealing means 23 between housing H and flange 21, and the sealing means 26 between flange 21 and carrier ring 20, limits the flow of fluid through the chamber C along the shaft S to a path leading radially between the carrier rings 5 and 20.

The sectionalized mechanical sealing elements of the present invention are disposed in the radial path between the carrier rings 5 and 20. In this connection, a sealing ring 5a is carried by the carrier ring 5, and a sealing ring 20a is carried by the carrier ring 20. The sealing ring 5a may be composed of a hard wear-resistant material such as a cobalt chromium alloy, for example, and is provided with a radially extended face 5b disposed in sealing engagement with a radially disposed face 5c of the carrier ring 5. Opposite the radial face 5b of sealing ring 5a, it is provided with a radial sealing face 5d.

The sealing ring 20a may be composed of carbon or a carbon composition and is provided with a radial face 20b disposed in sealing engagement with a radial face 20c on the carrier ring 20, and the face of sealing ring 20a opposite the face 20b is provided with a radial sealing face designated 20d which is disposed in opposed relation to the face 5d of sealing ring 5a. The respective sealing rings 5a and 20a are so constructed as to be removable from the shaft S intermediate the ends of the shaft, hence these sealing rings are sectionalized to provide a plurality of circular ring sectors.

In the illustrative embodiment, the sealing rings 5a and 20a are divided diametrically to provide a pair of sealing ring sectors having opposed axially extended coengageable sealing end surfaces 5e and 20e, respectively. These end surfaces 5e and 20e may be lapped to enable sealing coengagement responsive to radial loading of the ring sectors towards one another.

Means are provided for loading the sealing ring sectors towards one another so as to effect such sealing contact between the ends 5e and 20e, and preferably such means also loads the composite sealing ring 5a into sealing engagement with its carrier ring 5, and loads the composite sealing ring 20a into sealing engagement with its carrier ring 20. A loading collar 5f is adjustably mounted upon the carrier ring 5 by means of a suitable plurality of circumferentially spaced screw fasteners 5g. At its inner periphery, the loading collar 5f is provided with an inwardly extended flange 5h having an angularly extended face 5j engaged with a correspondingly angular extended outer peripheral face 5k on the sealing ring 5a.

Accordingly, it will be observed that the screw fasteners 5g may be adjusted to move the loading collar 5f longitudinally, thereby effecting a radial wedging action on the segmental sealing ring 5a to load the ends 5e thereof into engagement. Such longitudinal movement of the loading collar 5f will force the segmental sealing ring 5a into sealing engagement with its carrier ring 5.

A loading collar 20f is connected to the carrier ring 20 by a suitable number of circumferentially spaced screw fasteners 20g. Like loading collar 5f, loading collar 20f has an inner peripheral flange 20h provided with an angularly disposed face 20j engaged with a correspondingly angularly extended face 20k of segmental sealing ring 20a. Thus the loading collar 20f is also effective to load the end sealing faces 20e of the segmental sealing ring 20a and to load the segmental sealing ring 20a into sealing engagement with its carrier ring 20.

For the purpose of assembly, inspection, maintenance, and replacement of the sealing rings 5a and 20a, it will be recognized upon reference to FIG. 2, that when the loading collar 5f is disconnected from the carrier ring 5 the respective sectors of segmental sealing ring 5a may be applied about the shaft laterally between the ends of the shaft. Similarly, the segmental sealing ring 20a may be assembled with the carrier ring 20 intermediate the ends of the shaft, and the various sub-assemblies, as is now believed to be apparent, may be assembled within the housing as shown in FIG. 1, by moving them longitudinally of the shaft.

While the specific details of the invention are herein shown and described, changes and alterations may be resorted to without departing from the spirit of the invention as defined in the appended claims.

I claim:

1. A mechanical seal assembly comprising: a housing having a seal chamber therein, a shaft extending through said chamber, and means for preventing the flow of fluid through said chamber along said shaft including a sealing ring carried by said shaft and having a radially disposed sealing face, a sealing ring carried by said housing and having a radially disposed sealing face opposed to the sealing face of the first-mentioned sealing ring, each of said sealing rings being divided into ring sectors having longitudinally extended end faces, and means for loading said sectors towards one another to effect coengagement of said end sealing faces, said means for loading said sectors toward one another including a circumferentially extended support, circumferentially disposed means engageable with the respective ring sectors and cooperating with the latter to urge said sectors towards one another upon movement of said circumferentially disposed means relatively towards said circumferentially extended support, and means interconnecting said circumferentially extended support and said circumferentially disposed means for moving the same relatively one toward the other.

2. A mechanical seal assembly comprising: a housing having a seal chamber therein, a shaft extending through said chamber, and means for preventing the flow of fluid through said chamber along said shaft including a sealing ring carried by said shaft and having a radially disposed sealing face, a sealing ring carried by said housing and having a radially disposed sealing face opposed to the sealing face of the first-mentioned sealing ring, each of said sealing rings being divided into ring sectors having longitudinally extended end faces, and means for loading said sectors towards one another to effect co-engagement of said end sealing faces, the means for loading said sectors towards one another comprising a collar extending circumferentially of each of said rings, said collar and each ring having means for urging said sectors towards one another upon longitudinal movement of said collar, and means for moving said collar longitudinally.

3. A mechanical seal assembly as defined in claim 2, wherein each of said sealing rings is diametrically divided into a pair of sectors.

4. A mechanical seal assembly comprising: a housing having a seal chamber therein, a shaft extending through said chamber, and means for preventing the flow of fluid through said chamber along said shaft including a sealing ring carried by said shaft and having a radially disposed sealing face, a sealing ring carried by said housing and having a radially disposed sealing face opposed to the sealing face of the first-mentioned sealing ring, each of said sealing rings being divided into ring sectors having longitudinally extended end faces, and means for loading said sectors towards one another to effect co-engagement of said end sealing faces, said means for preventing the flow of fluid through said chamber including a supporting ring for each of said sealing rings, means sealing one of said supporting rings and said housing against passage of fluid therebetween, means sealing the other of said supporting rings and said shaft against the leakage of fluid therebetween, said sealing rings being carried by and sealingly engaged with the respective supporting rings, the means for loading said sectors towards one another comprising circumferentially disposed means wedgingly engaging said sectors, and means connected to the respective supporting ring and the respective circumferentially disposed means to move said circumferentially disposed means into wedging relation to said sectors.

5. A mechanical seal assembly comprising: a housing having a seal chamber therein, a shaft extending through said chamber, and means for preventing the flow of fluid through said chamber along said shaft including a sealing ring carried by said shaft and having a radially disposed sealing face, a sealing ring carried by said housing and having a radially disposed sealing face opposed to the sealing face of the first-mentioned sealing ring, each of said sealing rings being divided into ring sectors having longitudinally extended end faces, and means for loading said sectors towards one another to effect co-engagement of said end sealing faces, said means for preventing the flow of fluid through said chamber including a supporting ring for each of said sealing rings, means sealing one of said supporting rings and said housing against passage of fluid therebetween, means sealing the other of said supporting rings and said shaft against the leakage of fluid therebetween, said sealing rings being carried by and sealingly engaged with the respective supporting rings, and said means for loading said sectors towards one another including means carried by each of said supporting rings for movement relative thereto and engaged with at least one of said sectors to load the latter towards another sector upon such movement, and means for moving said means for loading said sectors towards one another.

6. A composite sealing means for a mechanical seal comprising a supporting ring having a radially disposed face, a mechanical seal ring composed of a plurality of sectors having opposed end faces disposed in sealing engagement, and means carried by said supporting ring and engaged with at least one of said sectors for loading the end faces of said sectors into sealing engagement, the means for loading the end faces of said sectors into sealing engagement comprising a collar carried by said supporting ring, said collar and said ring sectors having coengaged wedge surfaces for forcing the sectors towards one another upon longitudinal movement of said collar relative to said supporting ring, and means for moving said collar longitudinally.

7. A composite sealing means for a mechanical seal comprising a supporting ring, a mechanical seal ring composed of a plurality of sectors having opposed end faces disposed in sealing engagement, means carried by said supporting ring and engaged with at least one of said sectors for loading the end faces of said sectors into sealing engagement, adjustable means coengaged with said supporting ring and with said means for loading the end faces of said sectors into sealing engagement for causing movement toward one another of said supporting ring and said means for loading the end faces of said sectors into sealing engagement, and means providing a seal between said ring sectors and said supporting ring.

8. A composite sealing means as defined in claim 7, wherein said means for loading the end faces of said sectors into sealing engagement includes coengaged inclined surfaces provided on said ring sectors and on the means for loading the sectors into sealing engagement.

9. A mechanical seal assembly for preventing the flow of fluid between a pair of relatively rotatable members, comprising a relatively stationary seal ring having a radial face, means for connecting said ring to one of said members, a rotatable ring having a radial face in opposed sealing relationship to the radial face of said stationary ring, means for connecting said rotatable ring to the other of said members, one of said rings consisting of a plurality of segments having abutting end surfaces, said means for connecting said ring to its member including means cooperative with said member for wedging said end surfaces into engagement upon movement of said connecting means toward said member, and means interconnecting said connecting means to said member for effecting such movement.

References Cited in the file of this patent
UNITED STATES PATENTS
2,996,319   Copes ------------------ Aug. 15, 1961